Sept. 3, 1935.  D. E. CAMPBELL  2,013,234
TIRE GROOVING TOOL
Filed March 6, 1933
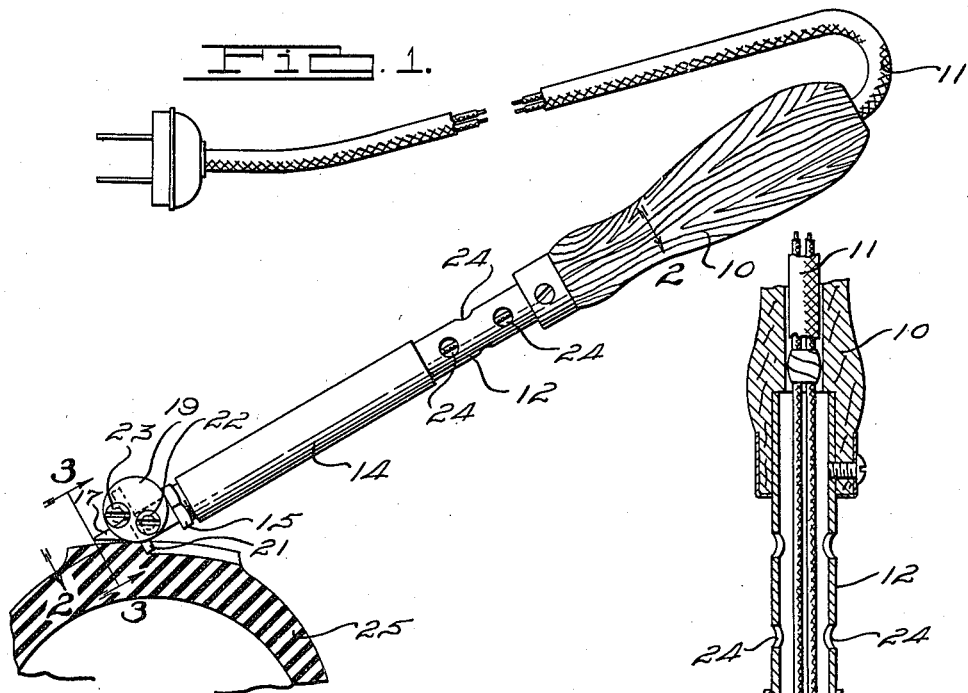
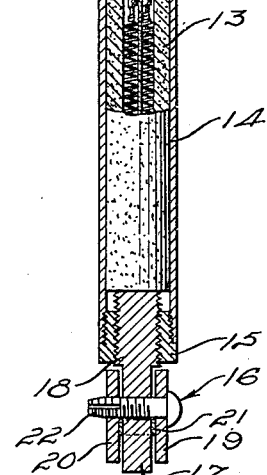
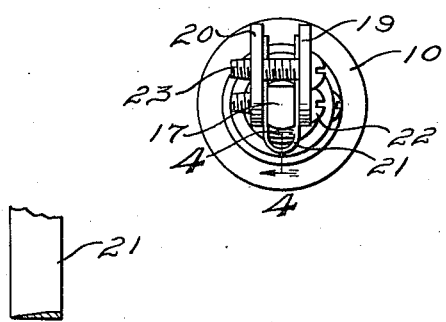
INVENTOR.
Dewey Edward Campbell.
BY
ATTORNEY.

Patented Sept. 3, 1935

2,013,234

UNITED STATES PATENT OFFICE 2,013,234

TIRE GROOVING TOOL

Dewey Edward Campbell, Detroit, Mich.

Application March 6, 1933, Serial No. 659,762

3 Claims. (Cl. 30—20)

My invention relates to a tire grooving tool and more particularly to an electrically heated tool used for the purpose of grooving the tread of rubber tires which have worn in such a manner as to become substantially smooth.

Prior to my invention tire grooving tools have been used to cut grooves in the tread portions of a tire upon which the tread has worn in such a manner as to present a substantially smooth surface to the road. Such tools have been characterized by the use of a fixed knife or knives which cut the rubber while in an unheated condition. The general use of such tools was not found to be satisfactory as the cold knife could cut the cold rubber only through the use of a considerable amount of pressure exerted on the knife. This in turn dulled the knife rapidly and prevented satisfactory results from its use.

Other devices heretofore known have attempted to overcome this objection by providing a heated knife. This, however, has not been satisfactory because the heat of the knife was rapidly dissipated upon its contact with the surface of the rubber and it was impossible to maintain a sufficiently hot condition in the knife to overcome the defects of a tool which operated without the use of heat.

It is, therefore, an object of my present invention to provide a tire grooving tool which is adapted to heat the rubber in advance of the cutting knife, and to cut the rubber with a heated knife while in the heated condition.

It is a further object of my present invention to provide a tire grooving tool in which the grooving knife is adjustable relative to the tool in order to permit the use of the same knife for cutting grooves of different depths.

It is a further object of my present invention to provide a tire grooving tool which is electrically heated in such a manner as to permit the accurate cutting of the groove in the tire with a minimum of dulling action to the cutting edge of the knife blade.

These and various other objects, features of arrangement, construction and operation, are plainly shown and described and will be best understood by reference to the accompanying drawing, in which:

Fig. 1 is a side elevation of a tire grooving tool embodying my invention shown in operative position relative to a fragmentary section of an automobile tire;

Fig. 2 is a fragmentary longitudinal section taken on the line 2—2 of Fig. 1;

Fig. 3 is an end elevation taken on the line 3—3 of Fig. 1;

Fig. 4 is a fragmentary section of the knife element taken on the line 4—4 of Fig. 3.

Similar reference numerals refer to similar parts throughout the several views.

Referring more in detail to the drawing, 10 designates a handle which may be formed of wood or other suitable non-heat-conducting material. An electric cord 11 extends through the handle 10 and inside a hollow body portion 12 to which the handle 10 is secured. An electrical heating element 13 is electrically connected with the cord 11 and is contained within a casing 14 adjacent the end of the body portion 12 and opposite its point of connection with the handle 10.

Secured to the casing 14 adjacent the heating element 13 is a screw-threaded plug 15, through which a cutting head 16 extends to a point of contact with the heating element 13. The cutting head 16 consists of an extending finger 17 having a screw-threaded shank portion 18. Knife clamping elements 19 and 20 are held in intimate contact with the knife 21 and the extending finger 17 by a screw-threaded member 22, which passes through the clamping elements 19 and 20 and the body of the finger 17. The knife clamping elements 19 and 20 are also maintained in clamping relation relative to the knife 21 by means of a second screw-threaded member 23 (Fig. 1), which passes through the elements 19 and 20 at a point adjacent the finger 17.

As shown in Fig. 3, the knife 21 is U-shaped in cross section and is sharpened as shown in Fig. 4 in such a manner as to present a cutting surface along its forward edge so as to cut a substantially U-shaped groove as it is moved relative to the surface of the tire.

In order to prevent overheating of the handle 10, a plurality of vents 24 is provided in the member 12.

The operation of a device embodying my invention is as follows:

When a tire 25 has been worn smooth on its tread portion, it is possible to regroove the tread by use of a tire grooving tool embodying my invention. The cord 11 is secured to any suitable electric outlet and the heating element 13 heats the cutting head 16. This heats both the finger 17 and the knife 21. After the head 16 is heated to a suitable temperature to soften the rubber to be grooved, the tool is applied to the surface of the rubber as shown in Fig. 1. As here shown, the finger 17 contacts the surface of the rubber in advance of the knife 21 and as the tool is moved it continues to heat the rubber at its point of contact with the rubber, which is in advance of the knife 21. The knife 21 extends below the lower surface of the finger 17 and its sharpened forward edge cuts into the surface of the rubber and forms a U-shaped groove therein as it is moved relative to the surface of the rubber. The knife 21 may be adjusted in such a manner as to permit cutting of the groove to any desired depth, this adjustment being accomplished by loosening of the screw-threaded elements 22 and 23 and the knife clamping elements 19 and 20, and moving the position of the knife relative thereto.

The heat which is transmitted from the heating element 13 to the casing 14 in the member 12 is partially dissipated by reason of the ports 24, and the member 12 is maintained in a somewhat cooler condition by the circulation of air through the interior thereof through the ports 24.

While I have shown and described a tire grooving tool having a substantially U-shaped knife 21, it is apparent that any other desired shape of knife may be used, and I do not desire to be limited by this disclosure to a knife of the precise type shown herein. Likewise, various other types of heads may be employed for other purposes within the scope of my invention, and I do not wish to be limited to the precise details of construction set forth, but desire to avail myself of all changes within the scope of the appended claims.

Having thus described my invention, what I claim is new and desire to secure by Letters Patent of the United States is:

1. A tire grooving tool including a handle, a cutting head, and a tubular body portion secured to said handle and said cutting head, means contained within said body portion and adapted to heat said cutting head and including an electrical resistance heating element, said cutting head including a grooving knife, a heated member adapted to contact a surface to be grooved in advance of said knife, and means for adjustably securing said knife to said heated member.

2. A tire grooving tool including a handle, a cutting head having an extending finger and an adjustable knife, a tubular body portion secured to said handle and said cutting head, and electrical heating means contained within said tubular body adjacent said cutting head and adapted to heat said extending finger and said adjustable knife whereby heat is conveyed to the surface to be grooved prior to cutting thereof by said adjustable knife.

3. A tire grooving tool including a handle, a cutting head having an extending finger and an adjustable knife, a tubular body portion secured to said handle and said cutting head, and means adapted to heat said extending finger and said adjustable knife whereby heat is conveyed to the surface to be grooved prior to cutting thereof by said adjustable knife.

DEWEY EDWARD CAMPBELL.